July 13, 1965 T. D. PARKS 3,194,337
MOTOR VEHICLE TRANSMISSION WITH MEANS TO PREVENT
DIFFERENTIAL ROTATION OF WHEELS
Filed Oct. 23, 1963 2 Sheets-Sheet 1

3,194,337
MOTOR VEHICLE TRANSMISSION WITH MEANS
TO PREVENT DIFFERENTIAL ROTATION OF
WHEELS
Theodore D. Parks, Guildford, Surrey, England, assignor to Dennis Brothers Limited, Guildford, England
Filed Oct. 23, 1963, Ser. No. 318,429
Claims priority, application Great Britain, Oct. 24, 1962, 40,226/62
7 Claims. (Cl. 180—74)

The invention relates to motor vehicle transmission systems.

Under normal ground conditions, a pair of wheels driven by the engine through a differential gear drive, will drivingly engage the ground and the vehicle will move; but where ground conditions are such that one or both of the wheels of the pair slip, the vehicle may be unable to move. An object of the invention is to provide means whereby this disadvantage will be overcome.

According to the invention there is provided in or for a motor vehicle having a pair of laterally-spaced wheels arranged to be driven through a differential gear drive positioned between them, an additional drive mechanism movable into or out of an operative position in which it positively couples one of the wheels of the pair to the other.

Preferably, the additional drive mechanism comprises a pair of laterally-spaced rollers positioned one at each side of the chassis for rotation about a common axis parallel with the common axis of the wheels and interconnected by shaft means to be supported from the chassis, the rollers being movable into and out of positions in which they will each engage a peripheral portion of the adjacent wheel of the said pair, thereby to effect a direct drive, through the rollers and the shaft means, from one to the other of the pair of wheels.

Each roller may be movable into and out of a position in which it is engageable with the peripheral face of the tyre of the respective wheel.

The rollers may be mounted on and rotatable with a shaft, arranged to extend transversely across the chassis and carried on arms or links arranged to be pivotally mounted on the chassis, whereby the rollers and the shaft are bodily movable, by swinging the arms or links about their pivots, into and out of the position in which the rollers engage the respective wheels.

By way of example, one form of the invention will now be described with reference to the accompanying drawings, in which.

Figure 1:
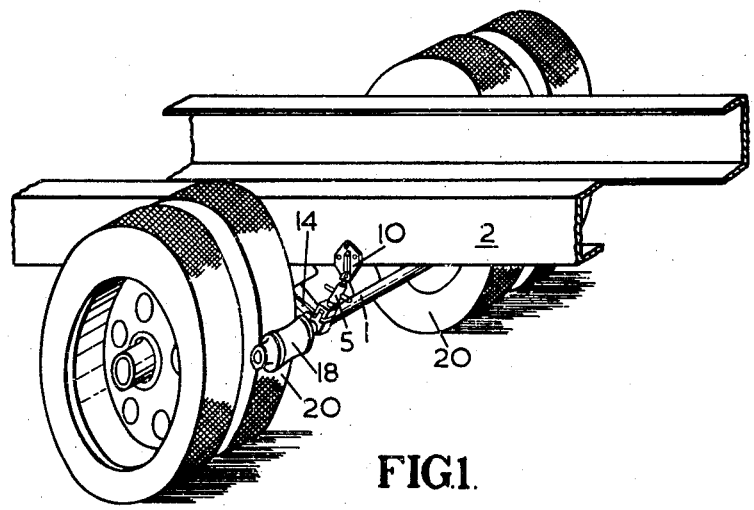
FIGURE 1 is a perspective view of the driven wheels and part of the chassis of a motor vehicle fitted with an additional drive mechanism in accordance with this invention, the said mechanism being shown in the operative position.
Figure 2:
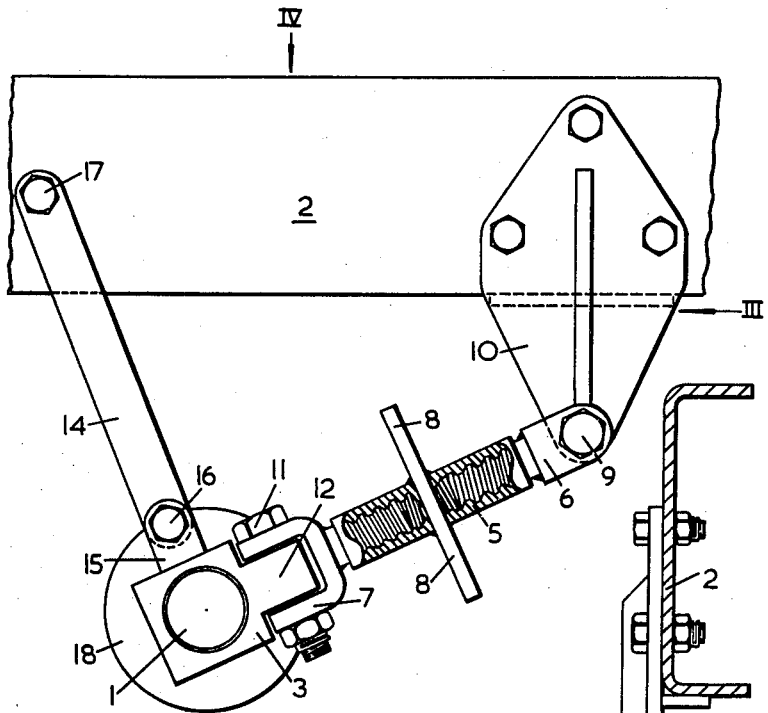
FIGURE 2 is a side view to a larger scale and part in section of the mechanism shown in FIGURE 1, the wheels of the vehicle having been omitted.
Figure 3:
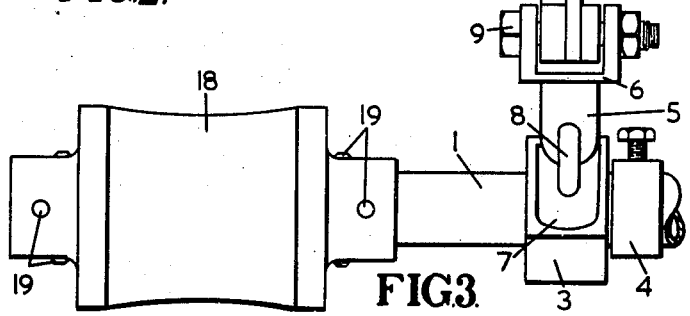
FIGURE 3 is an end view in the direction of arrow III in FIGURE 2 of a portion of the mechanism at one side only of the vehicle.
Figure 4:
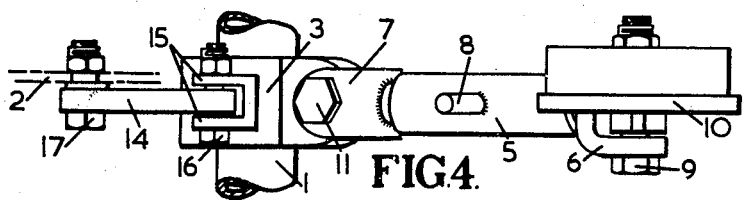
FIGURE 4 is a plan view in the direction of arrow IV in FIGURE 2 of a portion of the mechanism at one side only of the vehicle.

The additional drive mechanism comprises a shaft 1 extending transversely beneath the chassis 2 of the vehicle and carried in a pair of laterally-spaced bearing blocks 3 suspended from the chassis. The shaft 1 is located from axial movement in the bearing blocks by means of a pair of collars 4, each positioned adjacent the inside face of the adjacent bearing block 3, one in the position shown in FIGURE 3 and the other in a corresponding position adjacent the other end of the shaft. Each bearing block 3 is suspended from one or other side of the chassis by a pair of links, each pivotally connected at the lower end thereof to the respective bearing block and at the other end thereof to the chassis. One of the links at each side of the chassis is adjustable in length and comprises an internally screwed sleeve 5, which is engaged at each end with the screwed end of a pair of U-shaped shackles 6 and 7 in the manner of a turnbuckle. The threads at each end of the sleeve 5 are of opposite hands so that as the sleeve is turned by means of bars 8 extending radially from the sleeve 5, the distance between the shackles 6 and 7 can be varied. To facilitate rotation of the sleeve, the screw threads are of truncated form, e.g. Acme threads. At each side of the vehicle the upper shackle 6 is pivotally connected by a bolt 9 to a plate 10, bolted to the chassis, and the lower shackle 7 is pivotally connected by a bolt 11 to a tongle 12 on the bearing block 3. The other link at each side of the vehicle is a simple strap 14 of fixed length pivotally connected at its lower end between spaced jaws 15 on the bearing block 3 by a bolt 16 and pivotally connected at its upper end to the chassis 2 by a bolt 17. At each end of the shaft 1 there is a roller 18 secured by pins 19 to the shaft in longitudinal alignment with one of an interconnected pair of driven wheels of the vehicle. The peripheral surface of each roller is concave and is shaped to engage a peripheral portion of the tyre of the said wheel. The concave peripheral surface of each roller 18 may have longitudinally-extending ribs thereon to improve the engagement of the roller with the tyre. As each sleeve 5 is turned, the bearing blocks 3 and hence the shaft 1 will be swung in an arc about the axis of the pivot bolt 17 and so each roller 18 will be moved into and out of engagement with the tyre of the adjacent driven wheel of the vehicle. FIGURE 1 shows a roller 18 in its operative positions in which it engages the tyre of one of a pair of driven wheels 20. The other roller 18 is not shown but in the illustrated position it is also in engagement with the other wheel 20.

Under normal road conditions, the rollers 18 are in their inoperative positions in which they are spaced from the periphery of the tyres of the driven wheels 20; but if ground conditions are such that one of the driven wheels loses its adhesion with the ground and the vehicle is unable to be moved by the normal differential gear drive of the vehicle, the sleeves 5 are turned to bring the rollers 18 into engagement with the driving wheels, thereby directly coupling the slipping wheel through the shaft 1 to the other wheel of the pair, which is on firmer ground, thereby enabling the vehicle to move. When the vehicle has moved on to firmer ground and the slipping has stopped, the rollers 18 are retracted from the wheels by turning the sleeves 5 in the opposite direction and the normal transmission through the differential gear drive then takes place.

Other means for supporting the bearing blocks 3 from the chassis 2 may be employed. For example, the pair of links at each side of the vehicle may be replaced by a bell crank lever pivoted to the chassis, one arm of the lever being attached to the relevant bearing block 3 and the other arm being connected to operating means. Alternatively, the links of adjustable length, in the illustrated example, may be replaced by links adjustable by means other than the sleeve 5, for example the links may comprise a screw member engageable in a socket member, the screw member being supported and held from axial movement in a block pivotally mounted on the chassis and the socket member being pivotally mounted on the bearing block, whereby rotation of the screw member will alter the distance between the centres of the pivoted mountings. Alternatively, the adjustable links may be telescopic. The bell crank lever, screw, telescopic link or other operating member may be actuated by direct manual operation or by remote control, for example through a mechanical linkage or by fluid-operable means responsive to a fluid pressure derived from a pressurised oil system, compressed air or vacuum cylinders. The remote control means, where provided may be interconnected to the transmission system of the vehicle, so that the rollers 18 will be moved into and out of engagement automatically, when slip of a driven wheel takes place.

The additional drive mechanism may be fitted during the manufacture of a vehicle; but as the bearing blocks 3 can be supported at any desired position on a vehicle chassis and, as in the case of the illustrated example, the turnbuckle device provides a link of variable length, the additional drive mechanism may be used on different makes or types of vehicle and thus may be fitted to existing vehicles.

The additional drive mechanism may be used with vehicles having pairs of single or multiple driving wheels. In the latter case a single roller 18 can be provided at each end of the shaft 1, the rollers 18 each being engageable with only one of the wheels at each side of the chassis, as in FIGURE 1. Alternatively, there may be more than one roller at each end of the shaft 1, each engageable with a different driven wheel, or a longer roller capable of embracing both or all the driven wheels of the driven pair of multiple wheels at the respective side of the vehicle.

What I claim as my invention and desire to secure by Letters Patent of the United States is:

1. In a motor vehicle having a pair of laterally-spaced wheels driven through a differential gear drive positioned between them, an additional drive mechanism movable into and out of an operative position in which it positively couples one of the wheels of the pair to the other, the mechanism comprising a pair of laterally-spaced rollers to be positioned one at each side of the chassis of the vehicle for rotation about a common axis parallel with the common axis of the wheels, a rotatable shaft interconnecting said rollers and a pair of links pivotally mounted on each side of said chassis nad carrying said shaft, at least one of said links being adjustable in length whereby the shaft and the rollers are movable bodily into and out of positions in which they will each engage a peripheral portion of the adjacent wheels of said pair thereby to effect a direct drive through said rollers and said shaft from one to the other of said pair of wheels, so that when one wheel slips the rollers may be engaged with each of the wheels to drive the slipping wheel.

2. A mechanism as claimed in claim 1 in which the support means for the shaft comprises a pair of bearing blocks supporting said shaft and spaced apart laterally of the chassis and, attached to each block, a pair of links pivotally attached at adjacent ends to said block and arranged to be pivotally attached at their opposite ends to the chassis, one of said links supporting each block being of adjustable length, thereby to effect swinging of the blocks, the shaft and the rollers bodily into and out of positions in which each of said rollers engages the periphery of one of said wheels.

3. A mechanism as claimed in claim 2 in which each said adjustable link comprises a turnbuckle device by which its length is variable.

4. In a motor vehicle having a pair of laterally-spaced wheels driven through a differential gear drive positioned between them, an additional drive mechanism movable into and out of an operative position in which it positively couples one of the wheels of the pair to the other, the mechanism comprising a pair of laterally-spaced rollers to be positioned one at each side of the chassis of the vehicle for rotation about a common axis parallel with the common axis of the wheels, a rotatable shaft interconnecting said rollers and support means to be mounted on said chassis and carrying said shaft, said support means comprising a pair of bearing blocks supporting said shaft and spaced apart laterally of the chassis and, attached to each block, a pair of links pivotally attached at adjacent ends to said block and arranged to be pivotally attached at their opposite ends to the chassis, one of said links supporting each block being of adjustable length, thereby to effect swinging of the blocks, the shaft and the rollers bodily into and out of positions in which each of said rollers engages the periphery of one of said wheels and thereby to effect a direct drive through said rollers and said shaft from one to the other of said pair of wheels so that when one wheel slips, the rollers may be engaged with each of the wheels to drive the slipping wheel, each said adjustable link comprising interengaging screw and socket members, said screw member being supported by and held from axial movement by said chassis and said socket member being pivotally mounted on said bearing block, whereby rotation of said screw member will alter the distance between the centres of said pivotal mountings of each said adjustable link.

5. A motor vehicle including a pair of laterally-spaced wheels, an interconnecting differential gear drive by which they are driven, and an additional drive mechanism movable into and out of an operative position in which it positively couples one of said wheels to the other, the mechanism comprising a pair of laterally-spaced rollers positioned one at each side of the chassis of the vehicle for rotation about a common axis parallel with the common axis of the wheels, a rotatable shaft interconnecting said rollers and a pair of links pivotally mounted on each side of said chassis and carrying said shaft, at least one of said links being adjustable in length whereby the shaft and the rollers are movable bodily into and out of positions in which they engage a peripheral portion of the adjacent wheels of said pair, thereby to effect a direct drive through said rollers and said shaft from one to the other of said pair of wheels, so that when one wheel slips the rollers may be engaged with each of the wheels to drive the slipping wheel.

6. A vehicle as claimed in claim 5 in which the support means for said shaft comprises a pair of bearing blocks supporting said shaft and spaced apart laterally of the chassis and, attached to each said block, a pair of links pivotally attached at adjacent ends to said block and at their opposite ends to said chassis, one of said links supporting each said block being of adjustable length, thereby to effect swinging of the blocks, the shaft and the rollers bodily into and out of positions in which each of said rollers engages the periphery of one of said wheels.

7. A vehicle as claimed in claim 5 in which each said adjustable link comprises a turnbuckle device by which its length is variable.

References Cited by the Examiner

UNITED STATES PATENTS

| | | | |
|---|---|---|---|
| 1,897,944 | 2/33 | Carter | 180—22 |
| 2,134,258 | 10/38 | Mankoff | 74—13 |
| 2,944,616 | 7/60 | Bernard et al. | 180—19 |

BENJAMIN HERSH, *Primary Examiner.*

A. HARRY LEVY, *Examiner.*